US011562209B1

(12) United States Patent
Blundell et al.

(10) Patent No.: US 11,562,209 B1
(45) Date of Patent: Jan. 24, 2023

(54) RECOMMENDING CONTENT USING NEURAL NETWORKS

(71) Applicant: DeepMind Technologies Limited, London (GB)

(72) Inventors: Charles Blundell, London (GB); Julien Robert Michel Cornebise, London (GB)

(73) Assignee: DeepMind Technologies Limited, London (GB)

( * ) Notice: Subject to any disclaimer, the term of this patent is extended or adjusted under 35 U.S.C. 154(b) by 634 days.

(21) Appl. No.: 16/595,301

(22) Filed: Oct. 7, 2019

Related U.S. Application Data

(63) Continuation of application No. 14/821,463, filed on Aug. 7, 2015, now Pat. No. 10,438,114.

(60) Provisional application No. 62/034,657, filed on Aug. 7, 2014.

(51) Int. Cl.
*G06N 3/04* (2006.01)
*G06N 3/08* (2006.01)

(52) U.S. Cl.
CPC ............ *G06N 3/0472* (2013.01); *G06N 3/08* (2013.01)

(58) Field of Classification Search
CPC ............................... G06N 3/0472; G06N 3/08
See application file for complete search history.

(56) References Cited

U.S. PATENT DOCUMENTS

| 2003/0125621 | A1 | 7/2003 | Drukker |
| 2007/0271075 | A1 | 11/2007 | Chen |
| 2012/0016642 | A1 | 1/2012 | Li et al. |

(Continued)

FOREIGN PATENT DOCUMENTS

| WO | 2013/133879 | 9/2013 |
| WO | 2013/189261 | 12/2013 |

OTHER PUBLICATIONS

Agrawal and Goyal, "Analysis of Thompson sampling for the multi-armed bandit problem," In Proceedings of the 25th Annual Conference On Learning Theory (COLT), vol. 23, pp. 39.1-39.26, 2012.

(Continued)

*Primary Examiner* — Jean B Jeanglaude
(74) *Attorney, Agent, or Firm* — Fish & Richardson P.C.

(57) ABSTRACT

Methods, systems, and apparatus, including computer programs encoded on computer storage media, for content recommendation using neural networks. In One aspect, a method includes: receiving context information for an action recommendation from multiple possible actions; processing the context information using a neural network that includes Bayesian neural network layers to generate, for each of the actions, one or more parameters of a distribution over possible action scores for the action, where each parameter for each Bayesian layer is associated with data representing a probability distribution over multiple possible current values for the parameter; for each parameter of each Bayesian neural network layer, selecting the current value for the parameter using data representing probability distribution over possible current values for the parameter; and selecting an action from multiple possible actions using the parameters of the distributions over the possible action scores for the action.

18 Claims, 3 Drawing Sheets

(56) References Cited

U.S. PATENT DOCUMENTS

| | | | |
|---|---|---|---|
| 2012/0095863 A1* | 4/2012 | Schiff | G06Q 30/0282 705/26.7 |
| 2012/0330777 A1* | 12/2012 | Sathish | G06Q 30/02 705/26.7 |
| 2013/0339287 A1 | 12/2013 | Krause et al. | |
| 2014/0365313 A1 | 12/2014 | Reese | |

OTHER PUBLICATIONS

Agrawal and Goyal, "Thompson Sampling for Contextual Bandits with Linear Payoffs," Proceedings of the 30$^{th}$ International Conference on Machine Learning, JMLR: W&CP vol. 28, Jun. 2013, 9 pages.

Chapelle and Li, "An empirical evaluation of Thompson sampling," In Advances in Neural Information Processing Systems (NIPS), pp. 2249-2257, 2011.

MacKay, "A practical Bayesian framework for backpropagation networks," Neural computation, 4(3): 448-472, May 1992.

MacKay, "Probable networks and plausible predictions—a review of practical Bayesian methods for supervised neural networks," Network: Computation in Neural Systems, 6(3):469-505, Feb. 1995.

May et al., "Optimistic Bavesian sampling in contextual-bandit problems," The Journal of Machine Learning Research, 13(1):2069-2106, Jun. 2012.

Minka, "A family of algorithms for approximate Bayesian inference," PhD thesis, Massachusetts Institute of Technology, Jan. 2001, 75 pages.

Rezende et al., "Stochastic Backpropagation and Variational Inference in Deep Generative Models," Proceedings of the 31$^{st}$ International Conference on Machine Learning (ICML), Jun. 2014, 9 pages.

Zeiler et al., "On rectified linear units for speech processing," Acoustics, Speech and Signal Processing (ICASSP), 2013 IEEE International Conference on, May 2013, pp. 3517-3521.

\* cited by examiner

RECOMMENDING CONTENT USING NEURAL NETWORKS

CROSS-REFERENCE TO RELATED APPLICATIONS

This is a continuation of U.S. Application No. 14/821,463, filed on Aug. 7, 2015, which claims priority to U.S. Provisional Application No. 62/034,657 filed on Aug. 7, 2014. The disclosures of the prior applications are considered part of and are incorporated by reference in the disclosure of this application.

BACKGROUND

This specification relates to content recommendation systems.

Some systems that exist treat content recommendation as a contextual bandits problem. In particular, these existing systems receive contextual information for a content recommendation and select an action, e.g., a piece of content to be recommended, based on the contextual information and on rewards received in response to previous content recommendations made by the system. The received rewards generally depend on how successful the content recommendation was, e.g., on whether a user clicked on an advertisement that was recommended, or on whether a user elected to view a recommend piece of media content.

SUMMARY

This specification describes technologies that relate to recommending content using Bayesian neural networks.

In general, one innovative aspect of the subject matter described in this specification can be embodied in methods that include the actions of receiving context information for an action recommendation, wherein the action recommendation is a selection from a plurality of possible actions; processing the context information using a neural network that comprises one or more Bayesian neural network layers to generate, for each of the actions, one or more parameters of a distribution over possible action scores for the action, wherein each Bayesian neural network layer receives an input and applies a transformation to the input to generate an output from the received input in accordance with current values for each of a set of parameters, wherein each parameter for each Bayesian neural network layer is associated with data representing a probability distribution over a plurality of possible current values for the parameter, and wherein processing the context information using the neural network to select the action comprises: for each parameter of each Bayesian neural network layer, selecting the current value for the weight using the data representing the probability distribution over the plurality of possible current values for the parameter; and selecting an action from plurality of possible actions using the parameters of the distributions over the possible action scores for the action.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The subject matter described in this specification can be implemented in particular embodiments so as to realize one or more of the following advantages. Actions can be selected by accounting for uncertainty using a neural network that includes Bayesian neural network layers. For example, advertisements to be served with Internet resources can be effectively selected and media content can be effectively recommended using Bayesian neural network layers. By training a neural network to learn approximations of probability distributions for Bayesian neural network layers rather than exact probability distributions, the neural network can be effectively and efficiently trained for action selection. Additionally, by selecting action using a neural network that includes Bayesian neural network layers, as the neural network is trained, the uncertainty in the parameters of the Bayesian neural network layers is adjusted. Thus, the exploration/exploitation trade-off is adjusted automatically to approximately match the inherent uncertainty in the data. At each training step, the neural network can be trained on a respective mini-batch of data to adjust the approximations of the probability distributions, resulting in faster training and more accurate action selections.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
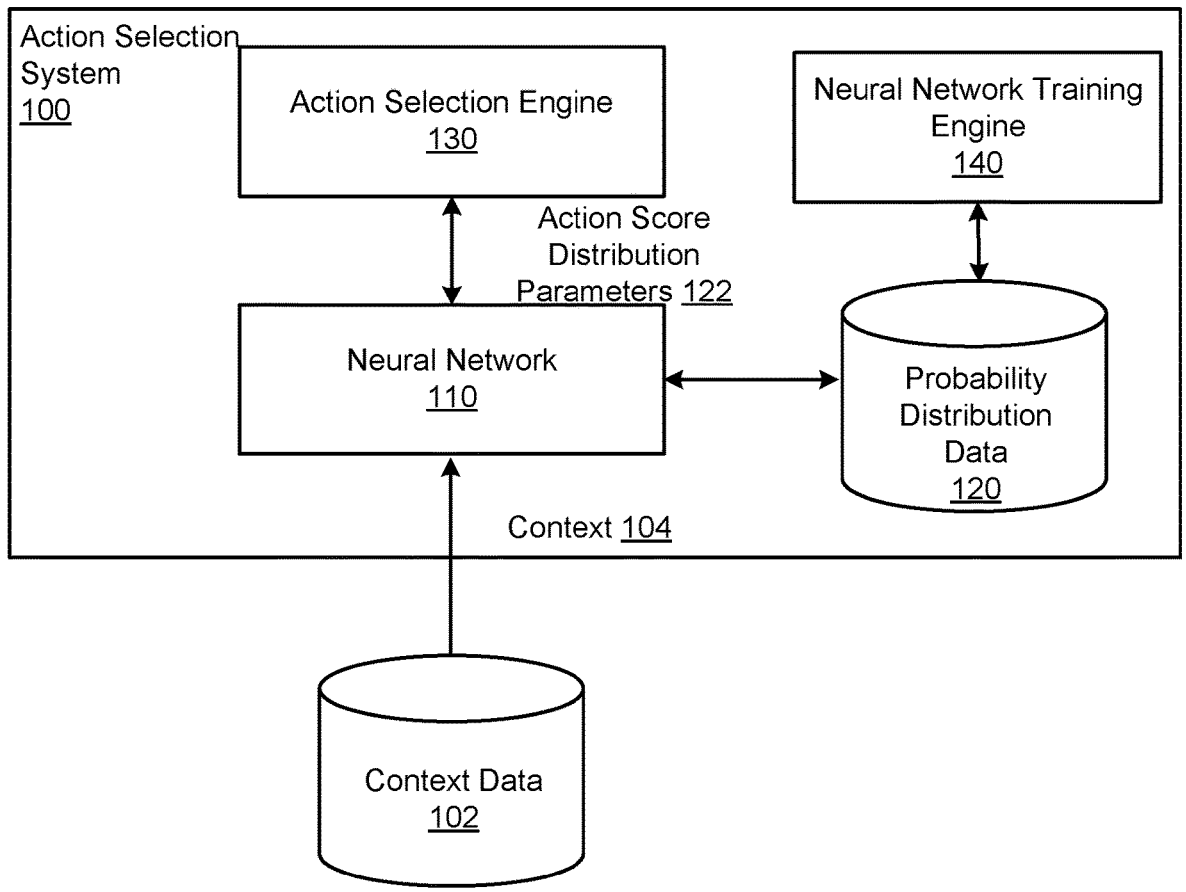
FIG. 1 shows an example action selection system.

FIG. 1 shows an example action selection system 100. The action selection system 100 is an example of a system implemented as computer programs on one or more computers in one or more locations, in which the systems, components, and techniques described below are implemented.

The action selection system 100 receives context information, e.g., context information 104 from a context data database 102, and selects an action from a set of actions.

For example, the action selection system 100 can be part of a content item recommendation engine that receives a request for one or more content items and context information associated with the request and, in response to the request, provides one or more content items or data identifying the one or more content items for presentation to a user. In this example, the context information received by the action selection system 100 is the context information associated with the request and the set of actions is the set of possible content items that can be recommended by the action selection system 100. The content items may be, for example, news articles, videos, images, or other media content to be recommended to a user, e.g., to a user who is currently viewing another piece of media content or a user who has requested recommended content from the recommendation engine. In this example, the context information can be information characterizing the user and, if available, information characterizing the piece of media content being viewed by the user. The context information can optionally also include information characterizing the pieces of media content in the set of possible content items, e.g., a text description of a piece of media content, or an automatically extracted set of features of the media content, e.g., duration, resolution, histogram of colors, and so on. The information characterizing the user may include, e.g., the location of the user, previous media content viewed by the user, and any other user information available to the recommendation engine.

As another example, the action selection system 100 can be part of an online advertisement system that receives requests for one or more advertisements to be served with web pages or other Internet resources that have been requested by users. In this example, the actions are the possible advertisements that can be served with Internet resources. The context information may include information characterizing the Internet resource, e.g., the title of the Internet resource, the uniform resource locator (URL) of the Internet resource, some or all of the content of the Internet resource, topics extracted from the contents of the Internet resource, entities referenced by the Internet resource, other Internet resources that link to the Internet resource, and so on, and information about the user, e.g., a location of the user, previous Internet resources visited by the user, previous advertisements selected by the user, and so on. The context information can also optionally include information characterizing the possible advertisements.

Generally, the action selection system 100 receives a reward in response to each action selection that is performed by the system. For example, in the online advertisement context, the reward received by the system may represent whether the online advertisement recommended by the system received a click from a user while the advertisement was presented by the user. For example, the system may receive one amount as a reward if the advertisement was clicked and a second, lower amount if the advertisement was not clicked. As another example, in the content item recommendation context, the system may receive one amount as a reward if the user selected to view the recommended context and a second, lower amount if the user did not view the recommended context or otherwise expressed that the recommended content was not to the liking of the user, e.g., by selecting a designated user interface element to indicate that the content item not be recommended by the system in the future.

As another example, the action selection system 100 can be part of an optimization system, e.g., a Bayesian optimization system, that is optimizing an objective function in accordance with a set of hyperparameters. In this example, the actions can be possible settings for the hyperparameters and the reward can be the values (or the negative values) of the objective function.

As another example, the action selection system 100 can be part of a social media recommendation system that recommends contacts to be added to a user's social network. In this example, the actions are possible contacts to be added to a given user's social network, the reward indicates whether the user added the recommended contact to the social network, and the context information includes information characterizing the user to whom the recommendation is being made and, optionally, the possible contacts.

As another example, the action selection system 100 can be part of a mobile application recommendation system that recommends mobile applications to be installed on a user's mobile device. In this example, the actions are the possible mobile applications that the system can recommend, the reward indicates whether the user installed the mobile application, and the context information includes information characterizing the user to whom the recommendation is being made and, optionally, the possible mobile applications. The information characterizing the user can include, for example, information identifying the mobile applications already installed on the user's mobile device.

As another example, the action selection system 100 can be part of a vacation or event recommendation system that recommends travel itineraries or destinations or events to users. In this example, the actions are the possible itineraries, destinations, or events that the system could recommend to the user, the reward indicates whether the user purchases the itinerary, buys a ticket to the destination, or buys a ticket to the event, and the context information includes information characterizing the user, e.g., the demographics of the user, travel history of the user, known interests of the user, and so on.

As another example, the action selection system 100 can be part of a job posting recommendation system that recommends job postings to users of the system. In this example, the actions are the set of current job postings for available positions, the reward indicates whether the user applied for the position or otherwise manifests an interest in the position, and the context information includes the resume of the user and, optionally, information characterizing the current job postings.

As another example, the action selection system 100 can be part of a consumer goods recommendation system that recommends consumer goods available for purchase from a retailer or other business. In this example, the actions are the set of consumer goods currently offered for sale by the business, the reward indicates whether the user purchased a recommended consumer good, and the context information includes information characterizing the user, e.g., demographics of the user, purchase history of the user, known interest of the user, and so on.

The action selection system 100 includes a neural network 110 that receives context information, e.g., context information 104, and, for each action in the set of actions, outputs the parameters of a distribution over a set of possible action scores for the action, e.g., action score distribution parameters 122 from context information 104. The action score for a given action represents an expected reward received by the system if the action is selected. For example, the parameters of the distribution may be an average of the distribution, e.g., the mean or the median, and the standard deviation and variance of the distribution. In some implementations, the neural network 100 outputs only a portion of the parameters of the distribution, e.g., only the average of the action scores and not the standard deviation or variance.

The neural network 110 includes multiple layers and receives as an input the context information for an action selection and feeds the inputs through each layer of the neural network in sequence to an output layer that generates the output for the action selection, i.e., the action score distribution parameters scores for the actions in the set of actions. The neural network 110 generally includes a set of neural network layers that each receives an input and generates an output from the received input by applying a non-linear transformation to the received input in accordance with a set of parameters. For example, the neural network may include one or more rectified linear unit (ReLU) layers. Example ReLU layers are described in more detail in On rectified linear units for speech processing, Zeiler, M.D., Ranzato, M.; Monga, R.; Mao, M.; Yang, K.; Le, Q.V.; Nguyen, P.; Senior, A.; Vanhoucke, V.; Dean, J.; and Hinton, G.E., Acoustics, Speech and Signal Processing (ICASSP), 2013 IEEE International Conference on. As another example, the neural network may include one or more convolutional layers.

In particular, one or more of the layers of the neural network 110 that generate an output from a received input in accordance with current values of a set of parameters are Bayesian neural network layers. A Bayesian neural network layer is a layer for which each parameter is associated with data representing a probability distribution over the possible values of the parameter. That is, rather than maintaining current values for the parameters of the Bayesian neural network layers, the action selection system 100 maintains data representing probability distributions for each parameter of each Bayesian neural network layer, e.g., in a probability distribution data repository 120. In particular, as will be described in more detail below, the probability distribution data repository 120 stores, for each parameter of each Bayesian neural network layer, the parameters of an approximation of the probability distribution for the parameter. The parameters of the approximation of the probability distribution for the parameter will be referred to in this specification as "hyperparameters" for the parameter.

As will be discussed in more detail below, in order to determine the values for the parameters of the Bayesian neural network layers to be used to process a given input, the action selection system 100 selects current values for the parameters using the probability distribution data for the parameters.

The neural network 110 may also include one or more other neural network layers that receive an input and generate an output from the input but that do not have parameters, e.g., an input layer, an output layer, max pooling layers, regularization layers, and so on.

The action selection system 100 also includes an action selection engine 130 that receives context information for a new action selection and provides the new observation to the neural network 110 for processing to generate the action score distribution parameters for the given action selection, e.g., action score distribution parameters 122, and selects one or more actions using the action score distribution parameters. For example, the action selection engine 130 can select the action having the highest average as the action to be performed for each action selection.

The action selection system 100 also includes a neural network training engine 140 that trains the neural network 110 on training data that includes a set of training observations. Each training observation includes context information for a given training action selection, the action selected in response to the context information, and the reward received for selecting the action. In particular, the action selection system 100 receives rewards in response to actions selected by the action selection engine 130. Once a reward is received, the action selection system 100 generates a training observation that includes the context information processed by the neural network 110 for the action selection, the action selected by the action selection engine 130, and the reward received in response to the action selection. The action selection system 100 then stores the training observation in a training data repository. At specified intervals, e.g., once a certain number of training observations have been received or once a certain amount of time has elapsed, the neural network training engine 140 trains the neural network 110 on the training data. In particular, the neural network training engine 140 trains the neural network 100 to adjust the values of the hyperparameters of the Bayesian neural network layers that are stored in the probability data distribution repository 120. Training the neural network 110 on training data is described below with reference to FIG. 3.

In some implementations, rather than storing the training observations in the training data repository for later use in training the neural network 110, the neural network training engine 140 trains the neural network "on-line." That is, the neural network training engine 140 can receive a reward and generate a training observation, train the neural network 110 on the training observation, and then discard the training observation without having to store the observation in the repository.

Figure 2:
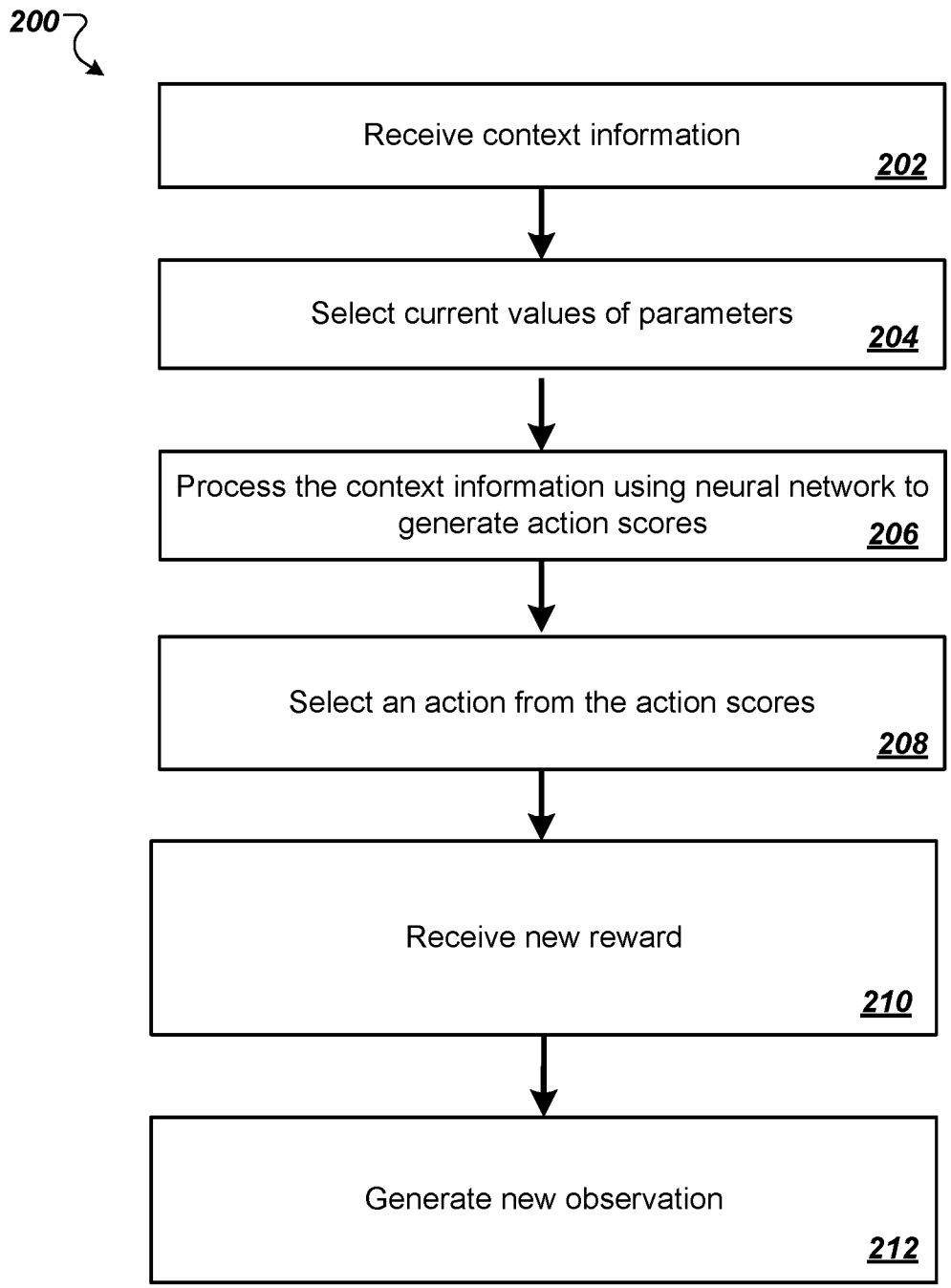
FIG. 2 is a flow diagram of an example process for selecting an action using context information.

FIG. 2 is a flow diagram of an example process 200 for selecting an action using context information. For convenience, the process 200 will be described as being performed by a system of one or more computers located in one or more locations. For example, an action selection system, e.g., the action selection system 100 of FIG. 1, appropriately programmed in accordance with this specification, can perform the process 200.

The system receives context information for an action selection (step 202).

The system selects current values for the parameters of each Bayesian neural network layer of a neural network, e.g., the neural network 110 of FIG. 1 (step 204). In order to select the current values, the system samples a value from probability distribution data for the parameters of the Bayesian neural network layers.

In particular, the system samples to select a value for each parameter of each Bayesian neural network layer using the hyperparameters for the Bayesian neural network layer that are stored in a probability distribution data store, e.g., the probability distribution data repository 120 of FIG. 1. In order to determine the hyperparameters for the Bayesian neural network layers, the system trains the neural network. Once the neural network has been trained, the system selects the current values of the parameters for the Bayesian neural network layers using the hyperparameters. Training the neural network to determine the hyperparameters is described in more detail below with reference to FIG. 3.

The system processes the context information using the neural network to generate action score distribution parameters for each action in a set of actions (step 206). In particular, the system feeds the context information through each layer of the neural network to generate the action score distribution parameters. During processing, each Bayesian neural network layer applies a transformation to input received by the Bayesian layer in accordance with the sampled values of the parameters of the Bayesian layer.

The system selects one or more actions from the set of actions using the action score distribution parameters (step 208). In some implementations, the system selects one or more of the actions having the highest averages as the actions to be performed in response to the context information. In some other implementations, the system can select, with one probability, the one or more actions having the highest averages, and with another probability, randomly select one or more actions from the set of action scores.

The system receives a reward in response to the action selection (step 210).

The system generates a training observation (step 212) from the context information, the selected action, and the reward and stores the training observation in a training data repository for use in training the neural network or uses the training observation in an "on-line" training process.

Figure 3:
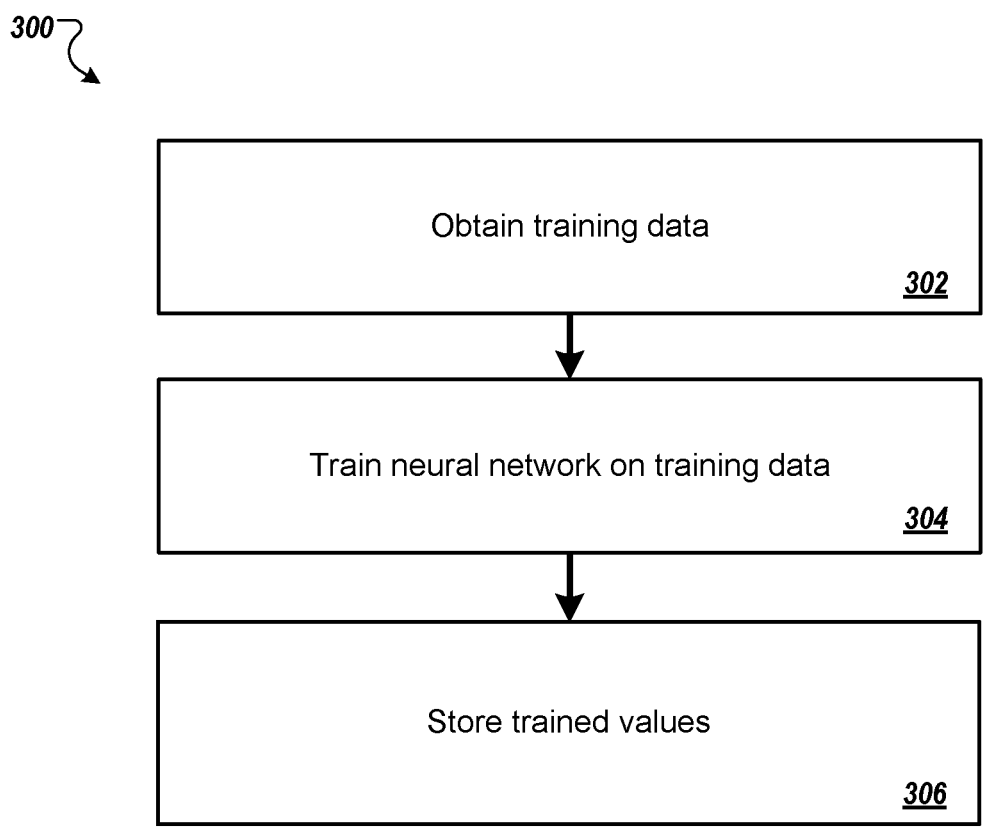
FIG. 3 is a flow diagram of an example process for training a neural network to adjust the parameters of approximations of probability distributions for nodes of Bayesian neural network layers.

FIG. 3 is a flow diagram of an example process 300 for training a neural network to adjust the parameters of Gaussian approximations of probability distributions for nodes of Bayesian neural network layers. For convenience, the process 300 will be described as being performed by a system of one or more computers located in one or more locations. For example, an action selection system, e.g., the action selection system 100 of FIG. 1, appropriately programmed in accordance with this specification, can perform the process 300.

The process 300 can be performed to train a neural network, e.g., the neural network 110 of FIG. 1, that has one or more Bayesian neural network layers. In particular, the process 300 can be performed each time certain criteria are satisfied, e.g., each time a certain number of training observations have been added to a training data repository or a certain interval of time has elapsed. Thus, the neural network can be trained using the results of previous action selections processed by the neural network while continuing to process context information for additional action selections. In some implementations, prior to the neural network being used to make action selections at run time, the neural network is trained on training data obtained from action selections made by another system. Additionally, in some implementations, the system trains the neural network "on-line" rather than retrieving the training data from a training data repository.

The system obtains training data for the neural network (step 302). The training data includes a set of training observations. Each training observation includes, context information for a given training action selection, the action selected in response to the context information, and the reward received for selecting the action. For example, the training data can generated from a threshold number of preceding action selections performed by the system or from each action selection performed by the system within a threshold time period.

The system trains the neural network on the training data (step 304) to determine trained values of the parameters of any non-Bayesian neural network layers in the neural network, i.e., to adjust the parameter values from their current values to the trained values, and to adjust the parameters of approximations of probability distributions for the parameters of the nodes of Bayesian neural network layers in the neural network ("hyperparameters" of the nodes). The approximations are parametric or variational approximations for which the mapping from uniform random numbers to a sample is differentiable. For example, the approximations may be Gaussian approximations. In the case of Gaussian approximations, the hyperparameters may be the mean and the standard deviation or the variance of the Gaussian distribution.

In particular, the system trains the neural network on the training data using a stochastic backpropagation technique to determine trained values of the hyperparameters. In some implementations, in order to determine the trained values of the parameters that define the Gaussian approximations, the system performs the stochastic backpropagation technique to minimize, in expectation, the following cost function:

KL[q(weights)∥P(weights)]−$E_{q(weights)}$[log P(training-data∣weights)], where KL is Kullback-Leibler divergence, E is an expectation, and q(weights) is an approximation of the probability distributions for the parameters of the Bayesian neural network layers given the training data.

During training, the system computes the gradients of the cost function with respect to the hyperparameters, e.g., for a Gaussian approximation, the mean and the standard deviation or the variance. In some cases, if the evaluation of the expectation term of the cost function is not tractable, the system approximates the computation for the expectation term using a Monte Carlo approximation. Stochastic backpropagation and backpropagating through intractable expectations are described in more detail in D. J. Rezende, S. Mohamed, D. Wierstra. Stochastic Backpropagation and Variational Inference in Deep Generative Models. International Conference on Machine Learning (ICML), June 2014.

The system stores the trained values of the hyperparameters in a probability distribution data store (step 306). That is, the system replaces the current values of the hyperparameters with the trained values in the probability distribution data store. The system also replaces current values of the parameters of any non-Bayesian neural network layers with trained values of those parameters.

As described above, in some implementations, the process 200 for performing action selections and the process 300 for training the neural network are decoupled. That is, one or more processes executing in the system, e.g., the action selection engine 130 of FIG. 1, can perform action selections while one or more independent processes executing in the system, e.g., the neural network training engine 140 of FIG. 1, train the neural network on training data that is generated as a result of the performed action selections and update the values of the hyperparameters stored in the probability distribution data repository used by the action selection processes to sample current values for the parameters of the Bayesian neural network layers. In particular, the training processes can re-train the neural network after a certain number of new training observations have been generated or after a certain period of time has elapsed since the last time the neural network was trained.

Additionally, as described above, the system generates and stores training observations in a training data repository. However, in some implementations, the system trains the neural network "on-line" instead of in addition to training the neural network on training observations in the training data repository.

As described above, the system generates action scores that represent an expected reward received by the system if the action is selected. In some implementations, however, the action scores can instead represent an expected return received by the system, where the expected return is a combination of future rewards received by the system in response to the current action selection and future action selections. In these implementations, to train the neural network, the system uses training observations that include returns that are a combination, e.g., a weighted sum, of multiple rewards received by the system.

Additionally, in some implementations, the context information that is received by the system for a given action selection setting can include information that characterizes not only the current action selection setting, but also previous action selection settings. For example, the context information can also include information characterizing previous action selection settings, the action selected by the system in each previous action selection setting, and the reward received by the system for each previous action selection setting.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, subprograms, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a client computer having a relationship graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
   receiving context information for an action recommendation, wherein the action recommendation is a selection from a plurality of possible actions;
   processing the context information using a neural network that comprises one or more Bayesian neural network layers to generate, for each of the actions, one or more parameters of a distribution over possible action scores for the action, wherein each Bayesian neural network layer receives an input and applies a transformation to the input to generate an output from the received input in accordance with current values for each of a set of parameters, wherein each parameter for each Bayesian neural network layer is associated with data representing a probability distribution over a plurality of possible current values for the parameter, wherein the action score for a given action represents an expected return received if the action is selected, wherein the expected return is a combination of the expected reward received if the action is selected and a plurality of expected future rewards received in response to future action selections, and wherein processing the context information using the neural network to select the action comprises:
   for each parameter of each Bayesian neural network layer, selecting the current value for the parameter using the data representing the probability distribution over the plurality of possible current values for the parameter; and
   selecting an action from plurality of possible actions using the parameters of the distributions over the possible action scores for the action.

2. The method of claim 1, wherein, for each of the parameters, the data representing the probability distribution over the plurality of possible current values is hyperparameters for the parameter, wherein the hyperparameters for the parameter are parameters of an approximation of the probability distribution for the parameter.

3. The method of claim 2, further comprising:
   training the neural network on training data to adjust the values of the hyperparameters of the Bayesian neural network layers.

4. The method of claim 3, wherein training the neural network on training data comprises training the neural network using stochastic backpropagation.

5. The method of claim 1, wherein the action score for a given action represents an expected reward received if the action is selected.

6. The method of claim 1, further comprising:
   receiving a reward in response to selecting the action;
   generating a training observation that includes the context information, the selected action, and the received reward; and
   storing the training observation as training data for use in training the neural network.

7. The method of claim 1, further comprising:
   receiving a reward in response to selecting the action;
   generating a training observation that includes the context information, the selected action, and the received reward; and
   training the neural network on-line using the training observation.

8. The method of claim 1, wherein the one or more parameters of the distribution over possible action scores is an average of the possible action scores.

9. The method of claim 8, wherein selecting an action score comprises selecting an action score having a highest average.

10. A computer program product encoded on one or more non-transitory computer storage media, the computer program product comprising instructions that when executed by one or more computers cause the one or more computers to perform operations comprising:
    receiving context information for an action recommendation, wherein the action recommendation is a selection from a plurality of possible actions;
    processing the context information using a neural network that comprises one or more Bayesian neural network layers to generate, for each of the actions, one or more parameters of a distribution over possible action scores for the action, wherein each Bayesian neural network layer receives an input and applies a transformation to the input to generate an output from the received input in accordance with current values for each of a set of parameters, wherein each parameter for each Bayesian neural network layer is associated with data representing a probability distribution over a plurality of possible current values for the parameter, wherein the action score for a given action represents an expected return received if the action is selected, wherein the expected return is a combination of the expected reward received if the action is selected and a plurality of expected future rewards received in response to future action selections, and wherein processing the context information using the neural network to select the action comprises:
    for each parameter of each Bayesian neural network layer, selecting the current value for the parameter using the data representing the probability distribution over the plurality of possible current values for the parameter; and selecting an action from plurality of possible actions using the parameters of the distributions over the possible action scores for the action.

11. A system comprising one or more computers and one or more storage devices storing instructions that when executed by the one or more computers cause the one or more computers to perform operations comprising:

receiving context information for an action recommendation, wherein the action recommendation is a selection from a plurality of possible actions;

processing the context information using a neural network that comprises one or more Bayesian neural network layers to generate, for each of the actions, one or more parameters of a distribution over possible action scores for the action, wherein each Bayesian neural network layer receives an input and applies a transformation to the input to generate an output from the received input in accordance with current values for each of a set of parameters, wherein each parameter for each Bayesian neural network layer is associated with data representing a probability distribution over a plurality of possible current values for the parameter, wherein the action score for a given action represents an expected return received if the action is selected, wherein the expected return is a combination of the expected reward received if the action is selected and a plurality of expected future rewards received in response to future action selections, and wherein processing the context information using the neural network to select the action comprises:

for each parameter of each Bayesian neural network layer, selecting the current value for the parameter using the data representing the probability distribution over the plurality of possible current values for the parameter; and selecting an action from plurality of possible actions using the parameters of the distributions over the possible action scores for the action.

12. The system of claim 11, wherein, for each of the parameters, the data representing the probability distribution over the plurality of possible current values is hyperparameters for the parameter, wherein the hyperparameters for the parameter are parameters of an approximation of the probability distribution for the parameter.

13. The system of claim 12, further comprising:
training the neural network on training data to adjust the values of the hyperparameters of the Bayesian neural network layers.

14. The system of claim 11, wherein the action score for a given action represents an expected reward received if the action is selected.

15. The system of claim 11, further comprising:
receiving a reward in response to selecting the action;
generating a training observation that includes the context information, the selected action, and the received reward; and
storing the training observation as training data for use in training the neural network.

16. The system of claim 11, further comprising:
receiving a reward in response to selecting the action;
generating a training observation that includes the context information, the selected action, and the received reward; and
training the neural network on-line using the training observation.

17. The system of claim 11, wherein the one or more parameters of the distribution over possible action scores is an average of the possible action scores.

18. The system of claim 17, wherein selecting an action score comprises selecting an action score having a highest average.

* * * * *